US006711667B1

United States Patent
Ireton

(10) Patent No.: US 6,711,667 B1
(45) Date of Patent: *Mar. 23, 2004

(54) MICROPROCESSOR CONFIGURED TO TRANSLATE INSTRUCTIONS FROM ONE INSTRUCTION SET TO ANOTHER, AND TO STORE THE TRANSLATED INSTRUCTIONS

(75) Inventor: Mark A. Ireton, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/672,475

(22) Filed: Jun. 28, 1996

(51) Int. Cl.[7] ................................................. G06F 9/30
(52) U.S. Cl. ........................ 712/35; 712/209; 712/227
(58) Field of Search ................................ 395/385, 567, 395/568; 712/34, 35, 209, 227

(56) References Cited

U.S. PATENT DOCUMENTS

| | | | | |
|---|---|---|---|---|
| 3,698,007 A | * | 10/1972 | Malcolm et al. | ............ 395/568 |
| 4,439,828 A | * | 3/1984 | Martin | ........................ 395/567 |
| 4,839,797 A | * | 6/1989 | Katori et al. | ................ 395/386 |
| 4,841,476 A | * | 6/1989 | Mitchell et al. | ............ 395/568 |
| 4,870,614 A | * | 9/1989 | Quatse | ........................ 395/733 |
| 5,115,500 A | * | 5/1992 | Larsen | ........................ 395/385 |
| 5,491,828 A | * | 2/1996 | Intrater et al. | ......... 395/800.35 |
| 5,568,646 A | * | 10/1996 | Jaggar | ........................ 395/385 |
| 5,588,118 A | * | 12/1996 | Mandava et al. | ........... 395/384 |
| 5,619,665 A | * | 4/1997 | Emma | ........................ 712/208 |
| 5,623,617 A | * | 4/1997 | Davidian | .................... 395/568 |
| 5,638,525 A | * | 6/1997 | Hammond et al. | ......... 395/385 |

OTHER PUBLICATIONS

John L. Hennessy and David A. Patterson, "Computer Architecture A Quantitative Approach," 1990, pp. 408–428 and 454–474.
Advanced Micro Devices, Inc., "AMD5$_K$86™ Processor, Technical Reference Manual," 1996, pp. 2–2 and 2–3.

* cited by examiner

*Primary Examiner*—Richard L. Ellis
(74) *Attorney, Agent, or Firm*—Meyertons Hood Kivlin Kowert & Goetzel, P.C.; B. Noël Kivlin

(57) ABSTRACT

A microprocessor including an instruction translation unit and a storage control unit is provided. The instruction translation unit scans the instructions to be executed by the microprocessor. The instructions are coded in the instruction set of a CPU core included within the microprocessor. The instruction translation unit detects code sequences which may be more efficiently executed in a DSP core included within the microprocessor, and translates detected code sequences into one or more DSP instructions. The instruction translation unit conveys the translated code sequences to a storage control unit. The storage control unit stores the code sequences along with the address of the original code sequences. As instructions are fetched, the storage control unit is searched. If a translated code sequence is stored for the instructions being fetched, the translated code sequence is substituted for the code sequence.

8 Claims, 7 Drawing Sheets

MICROPROCESSOR CONFIGURED TO TRANSLATE INSTRUCTIONS FROM ONE INSTRUCTION SET TO ANOTHER, AND TO STORE THE TRANSLATED INSTRUCTIONS

BACKGROUND OF THE INVENTION

1. Field of the Invention

This invention relates to the field of microprocessors and, more particularly, to instruction translation mechanisms within microprocessors.

2. Description of the Relevant Art

Computer systems employ one or more microprocessors, and often employ digital signal processors (DSPs). The DSPs are typically included within multimedia devices such as sound cards, speech recognition cards, video capture cards, etc. The DSPs function as coprocessors, performing complex and repetitive mathematical computations demanded by multimedia devices and other signal processing applications more efficiently than general purpose microprocessors. Microprocessors are typically optimized for performing integer operations upon values stored within a main memory of a computer system. While DSPs perform many of the multimedia functions, the microprocessor manages the operation of the computer system.

Digital signal processors include execution units which comprise one or more arithmetic/logic units (ALUs) coupled to hardware multipliers which implement complex mathematical algorithms in a pipelined manner. The instruction set primarily comprises DSP-type instructions (i.e. instructions optimized for the performance of complex mathematical operations) and also includes a small number of non-DSP instructions. The non-DSP instructions are in many ways similar to instructions executed by microprocessors, and are necessary for allowing the DSP to function independent of the microprocessor.

The DSP is typically optimized for mathematical algorithms such as correlation, convolution, finite impulse response (FIR) filters, infinite impulse response (IIR) filters, Fast Fourier Transforms (FFTs), matrix computations, and inner products, among other operations. Implementations of these mathematical algorithms generally comprise long sequences of systematic arithmetic/multiplicative operations. These operations are interrupted on various occasions by decision-type commands. In general, the DSP sequences are a repetition of a very small set of instructions that are executed 70% to 90% of the time. The remaining 10% to 30% of the instructions are primarily boolean/decision operations. An exemplary DSP is the ADSP 2171 available from Analog Devices, Inc. of Norwood, Mass.

As used herein, the term "instruction set" refers to a plurality of instructions defined by a particular microprocessor or digital signal processor architecture. The instructions are differentiated from one another via particular encodings of the bits used to form the instructions. In other words, each instruction within the instruction set may be uniquely identified from other instructions within the instruction set via the particular encoding. A pair of instructions from different instruction sets may have the same encoding of bits, even if the instructions specify dissimilar operations. Additionally, instruction sets may specify different encoding schemes. For example, one instruction set may specify that the operation code (or opcode), which uniquely identifies the instruction within the instruction set, be placed in the most significant bit positions of the instruction. Another instruction set may specify that the opcode be embedded within the instructions. Still further, the number and size of available registers and other operands may vary from instruction set to instruction set.

An instruction sequence comprising a plurality of instructions coded in a particular order is referred to herein as a code sequence. A code sequence which represents a larger function (such as a code sequence which, when executed, performs a fast Fourier transform) is referred to as a routine.

Unfortunately, many routines which perform complex mathematical operations are coded in the x86 instruction set. Such mathematical routines often may be more efficiently performed by a DSP. Microprocessors often execute instructions from the x86 instruction set, due to its widespread acceptance in the computer industry. This widespread acceptance also explains why many complex mathematical routines may be coded in the x86 instruction set. Conversely, DSPs develop instruction sets which are optimized for mathematical operations common to signal processing. Because the DSP instruction set is optimized for performing mathematical operations, it is desirable to determine that a routine may be more efficiently executed in a DSP and to route such a routine to a DSP for execution.

SUMMARY OF THE INVENTION

The problems outlined above are in large part solved by a microprocessor in accordance with the present invention. The microprocessor includes an instruction translation unit and a storage control unit. The instruction translation unit scans the instructions to be executed by the microprocessor. The instructions are coded in the instruction set of a CPU core included within the microprocessor. The instruction translation unit detects code sequences which may be more efficiently executed in a DSP core included within the microprocessor, and translates detected code sequences into one or more DSP instructions. Advantageously, the microprocessor may execute the code sequences more efficiently. Performance of the microprocessor upon computer programs including the code sequences may be increased due to the efficient code execution.

The instruction translation unit conveys the translated code sequences to a storage control unit. The storage control unit stores the code sequences along with the address of the original code sequences. As instructions are fetched, the storage control unit is searched. If a translated code sequence is stored for the instructions being fetched, the translated code sequence is substituted for the code sequence. Advantageously, a code sequence may be translated once and the stored translation used upon subsequent fetch of the code sequence. Particularly in cases where the instruction translation mechanism occupies numerous clock cycles, performance of the microprocessor may be increased. A large portion of the computer program may be scanned, or the translation cycles may be bypassed in the instruction processing pipeline, depending upon the embodiment.

Broadly speaking, the present invention contemplates a microprocessor comprising an instruction translation circuit and a storage control unit. The instruction translation circuit is configured to translate a first plurality of instructions coded in a first instruction set into at least one instruction coded in a second instruction set. Coupled to receive the instruction from the second instruction set, the storage control unit is configured to cause storage of the instruction such that, upon execution of a code sequence including the first plurality of instructions, the instruction is substituted for the first plurality of instructions.

The present invention further contemplates a method of executing instructions in a microprocessor. A first plurality of instructions from a first instruction set is translated into at least one instruction from a second instruction set. The first plurality of instructions define an operation which is efficiently performed via execution in the second instruction set. A code sequence including the instruction and a second plurality of instructions coded in the first instruction set is executed in a first execution core and a second execution core within the microprocessor. The first execution core is configured to execute instructions from the first instruction set and the second execution core is configured to execute instructions from the second instruction set. The first execution core thereby executes the second plurality of instructions and the second execution core thereby executes the instruction from the second instruction set. The instruction from the second instruction set is stored via a storage control unit within the microprocessor, such that the instruction is executed in lieu of the first plurality of instructions upon execution of the code sequence.

BRIEF DESCRIPTION OF THE DRAWINGS

Other objects and advantages of the invention will become apparent upon reading the following detailed description and upon reference to the accompanying drawings in which.

Figure 1:
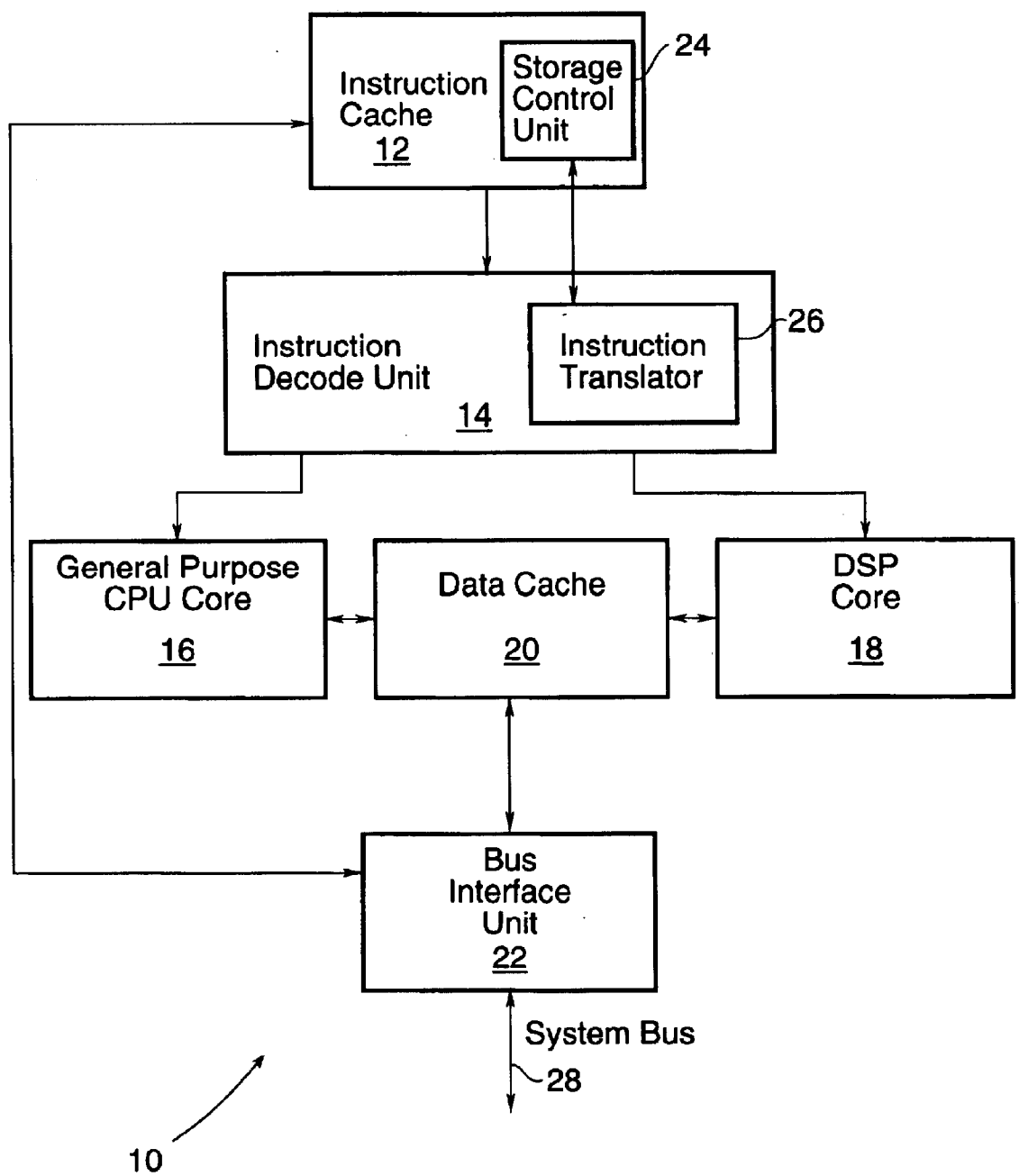
FIG. 1 is a block diagram of a microprocessor including an instruction cache and an instruction decode unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of a microprocessor 10 is shown. Microprocessor 10 includes an instruction cache 12, an instruction decode unit 14, a general purpose CPU core 16, a DSP core 18, a data cache 20, and a bus interface unit 22. Instruction cache 12 includes a storage control unit 24. Additionally, instruction decode unit 14 includes an instruction translator circuit 26. Bus interface unit 22 is coupled to a system bus 28, instruction cache 12, and data cache 20. Instruction cache 12 is additionally coupled to instruction decode unit 14, which is further coupled to CPU core 16 and DSP core 18. CPU core 16 and DSP core 18 are coupled to data cache 20. Finally, instruction translator circuit 26 is coupled to storage control unit 24.

Generally speaking, microprocessor 10 is configured to translate code sequences from the instruction set executed by CPU core 16 to the instruction set executed by DSP core 18. Code sequences may be translated when instruction translator circuit 26 detects that the code sequence may be more efficiently performed via DSP core 18 instead of CPU core 16. Code sequences which are not determined to be more efficient in DSP core 18 remain in the instruction set of CPU core 16 and are executed by CPU core 16. Advantageously, each code sequence is executed in the core which most efficiently executes that code sequence, despite the fact that each code sequence is written in the instruction set executed by CPU core 16.

Translating a code sequence from one instruction set to another may be a relatively slow process, requiring multiple clock cycles. In such cases, the performance increase experienced by microprocessor 10 due to increased execution efficiency may be deleteriously affected by the number of clock cycles used to perform the translation. For example, instruction decode unit 14 may utilize one clock cycle to decode instructions for CPU core 16. Conversely, multiple clock cycles may be employed to generate instructions for DSP core 18 within instruction translator circuit 26. The performance increase due to executing code sequences in DSP core 18 (measured in decreased numbers of clock cycles to complete the code sequence as compared to execution in CPU core 16) is decreased by the difference in clock cycles between decoding instructions for CPU core 16 and generating instructions for DSP core 18 (i.e. the multiple number of clock cycles–1).

In order to further increase performance, instruction translator circuit 26 transfers the translated code sequences to storage control unit 24. Storage control unit 24 stores the translated code sequences. In one embodiment, the instructions within a cache line (including the translated code sequence and the non-translated instructions within the cache line but not within the code sequence translated by instruction translator circuit 26) are stored by storage control unit 24. Storage control unit 24 stores the translated code sequence, as well as the address of the original code sequence. If the code sequence is subsequently fetched for execution, storage control unit 24 substitutes the translated instructions for the original instructions. Instruction translator circuit 26 is informed that the instructions being conveyed have been previously translated, and instruction translator circuit 26 bypasses the instructions. The clock cycles employed to perform the translation are thereby not experienced when executing previously translated instruction sequences. Performance may be further enhanced due to the clock cycles saved.

As used herein, the term "core" or "execution core" refers to circuitry configured to execute instructions from a particular instruction set. The core may include the registers defined by the instruction set, as well as circuitry for performing each of the instruction operations defined for the instruction set. CPU core 16 is a general purpose microprocessor core. In one embodiment, CPU core 16 may be an x86 core. Other cores, such as the PowerPC, the Digital Equipment Corporation's Alpha, and the MIPS core may be used as well. DSP core 18 is a digital signal processor core. In one embodiment, DSP core 18 is compatible with the ADSP 2171 instruction set.

Instruction cache 12 is a high speed cache memory for storing instructions for execution by microprocessor 10. Instructions may be fetched from instruction cache 10 more quickly than through bus interface unit 22 from a main memory connected thereto. Instruction cache 12 may be a fully associative, set associative, or direct mapped cache in various embodiments. If instructions fetched according to the code sequences being executed are not stored in instruction cache 12, then the instructions may be transferred by bus interface unit 22 to instruction cache 12. Additionally, instruction cache 12 may store branch prediction information in order to predict the direction of a branch instruction included in the instructions fetched. Subsequent fetch addresses may be generated according to the branch prediction information, or additional instructions may be fetched which are contiguous to the instructions fetched if no branch instruction is included. As used herein, the term address refers to a value which uniquely identifies a byte within a main memory system connected to system bus 28. Multiple contiguous bytes may be accessed via a particular address and a number of bytes to access.

Instruction decode unit 14 decodes instructions for CPU core 16 and DSP core 18. The decoded instructions are routed to the appropriate core by instruction decode unit 14 as well. Instruction decode unit 14 may be configured to simultaneously provide one or more instructions to CPU core 16 and DSP core 18, according to one embodiment.

Data cache 20 is a high speed cache memory for storing data accessed by CPU core 16 and DSP core 18. Both CPU core 16 and DSP core 18 may access data cache 20. Data cache 20 may be configured as a fully associative, set associative, or direct mapped cache according to various embodiments.

Bus interface unit 22 is configured to effect communication between microprocessor 10 and devices coupled to system bus 28. For example, instruction fetches which miss instruction cache 12 may be transferred from main memory by bus interface unit 22. Similarly, data requests performed by CPU core 16 or DSP core 18 which miss data cache 20 may be transferred from main memory by bus interface unit 22. Additionally, data cache 20 may discard a cache line of data which has been modified by microprocessor 10. Bus interface unit 22 transfers the modified line to main memory.

Figure 2:
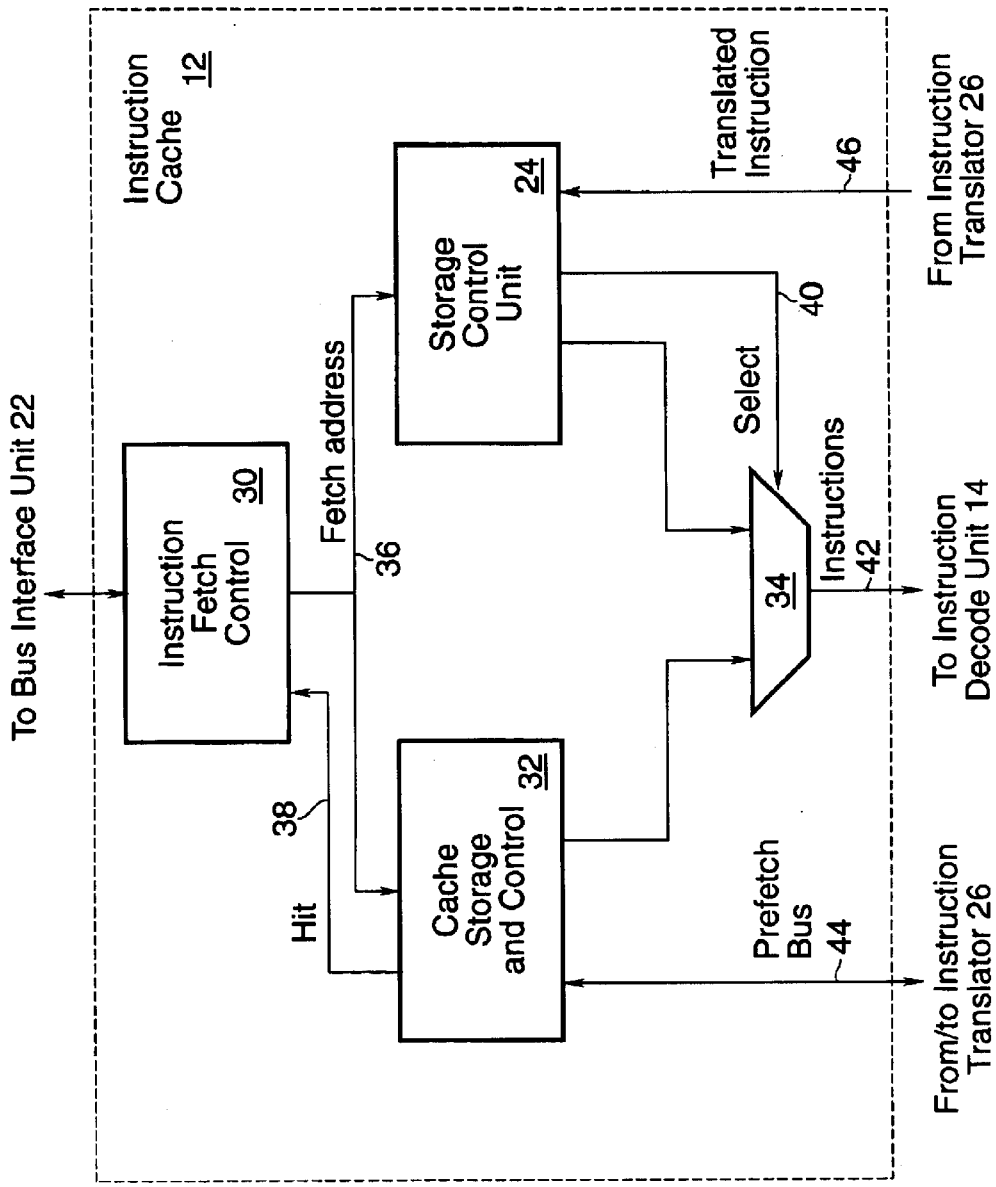
FIG. 2 is a block diagram of one embodiment of the instruction cache shown in FIG. 1, including a storage control unit.

Turning now to FIG. 2, a block diagram of one embodiment of instruction cache 12 is shown. Instruction cache 12 includes an instruction fetch control unit 30, a cache storage and control block 32, storage control unit 24, and a selection circuit 34. Instruction fetch control unit 30 is coupled to bus interface unit 22. Instruction fetch control unit 30 conveys a fetch address upon a fetch address bus 36 to both cache storage and control block 32 and storage control unit 24. Instructions corresponding to the fetch address are conveyed by both cache storage and control block 32 and storage control unit 24 to selection circuit 34. Additionally, storage control unit 24 conveys a selection control upon a select line 40 to selection circuit 34. Under control of the selection control, selection circuit 34 conveys instructions from either storage control unit 24 or cache storage and control block 32 upon an instructions bus 42 to instruction decode unit 14. Additionally conveyed upon instructions bus 42 may be the selection control upon select line 40 and the fetch address corresponding to the instruction. A hit line 38 is coupled between instruction fetch control unit 30 and cache storage and control block 32. A prefetch bus 44 is coupled between cache storage and control block 32 and instruction translator circuit 26, and a translated instructions bus 46 is coupled between storage control unit 24 and instruction translator circuit 26.

Instruction fetch control unit 30 forms a fetch address during each clock cycle based upon the instructions fetched in the previous clock cycle. The fetch address may be the result of branch prediction information stored within instruction fetch control unit 30, or may identify instructions contiguous to the instructions fetched in the previous clock cycle. Additionally, exception information from either CPU core 16 or DSP core 18 (not shown) may affect the fetch address formed by instruction fetch control unit 30. The fetch address is conveyed upon fetch address bus 36 to cache storage and control block 32 and storage control unit 24. If cache storage and control block 32 is storing instructions corresponding to the fetch address, cache storage and control block 32 asserts a hit signal upon hit line 38 to instruction fetch control unit 30. If instruction fetch control unit 30 receives an asserted hit signal, instruction fetching continues as described above. Conversely, instruction fetching stalls upon deassertion of the hit signal until the corresponding instructions are fetched from bus interface unit 22.

Cache storage and control block 32 includes storage for instructions and corresponding tag information in accordance with instruction cache 12's configuration (e.g. fully associative, set associative, or direct mapped). Instructions are stored in cache lines, which are a set of instruction bytes stored in contiguous main memory locations. The cache line is identified by a tag including a portion of the address of the first of the contiguous memory bytes, as well as state information indicating whether or not the cache line is valid. For purposes of locating bytes stored in a cache, an address may be divided into three portions. An offset portion includes the least significant bits of the address. The offset portion identifies an offset within the cache line. For a 32 byte cache line, for example, the first portion comprises 5 bits identifying the offset within the cache line. The second portion is the index portion of the address. The index portion includes the least significant bits of the address which are not included in the offset portion of the address. The index identifies a row within the cache storage in which the corresponding cache line may be stored. One or more cache lines may be stored with respect to each index. The remaining bits of the address comprise the tag portion of the address. The tag portion is stored in instruction cache storage and control block 32 with respect to the cache line. The tag is compared to fetch addresses provided by instruction fetch control unit 30 to determine if the appropriate instructions are stored in the cache (i.e. the instructions "hit" in the cache).

In parallel with searching cache storage and control block 32 for the instructions, storage control unit 24 is searched as well. Storage control unit 24 stores previously translated code sequences from instruction translator circuit 26. The address of the original code sequence is additionally stored. When a fetch address is conveyed upon fetch address bus 36, storage control unit 24 searches for the fetch address among the addresses identifying original code sequences for which translated code sequences are stored. If a translated code sequence is stored with respect to a particular fetch address, storage control unit 24 conveys the translated code sequence to selection circuit 34. Additionally, storage control unit 24 asserts the selection control upon select line 40 such that selection circuit 34 selects the instructions from storage control unit 24. When storage control unit 24 is not storing a translated code sequence, the selection control is deasserted. It is noted that selection circuit 34 is configured to select an output from one of a number of inputs according to a selection control input. Selection circuit 34 may comprise one or more multiplexor circuits, for example. The multiplexor circuits may be configured in parallel or cascade fashion for performing the selection of instructions from storage control unit 24 or cache storage and control block 32.

In one embodiment, storage control unit 24 stores the cache line of instructions containing the translated code sequence. Untranslated instructions within the cache line with the code sequence are stored in their untranslated state. In this manner, an instruction fetch may be completed via instructions from either cache storage and control block 32 or storage control unit 24.

Instructions corresponding to the fetch address are conveyed from instruction cache storage and control block 32 and storage control unit 24 to selection circuit 34. As noted above, storage control unit 24 asserts or deasserts the selection control upon select line 40. Either the instructions from instruction cache storage and control block 32 or the instructions from storage control unit 24 are thereby selected for conveyance upon instructions bus 42.

Instruction translator circuit 26 conveys translated instructions to storage control unit 24 upon translated instructions bus 46. Storage control unit 24 receives the translated instructions and allocates a storage location therein for the translated instructions. Translated instructions bus 46 conveys a cache line of instructions including the translated code sequence, as well as the address of the original code sequence.

Instruction translator circuit 26 may additionally communicate with cache storage and control block 32 via prefetch bus 44, according to one embodiment. Instruction translator circuit 26 may present a fetch address upon prefetch bus 44 and received the corresponding instructions upon prefetch bus 44 as well. In one embodiment, instruction translator circuit 26 attempts to scan instructions which are soon to be fetched by microprocessor 10 in order to provide translated instructions in a timely fashion. Instruction translator circuit 26 scans the instructions for code sequences which may be more efficiently executed by DSP core 18, and translates these code sequences. The translated code sequences are then stored into storage control unit 24 via translated instructions bus 46. Additionally, translator circuit 26 determines the next cache line of instructions which may be fetched via an examination of the instructions within the current set of instructions (e.g. by detecting and predicting the outcome of branch instructions). In this manner, instruction translation circuit 26 may attempt to scan additional instructions.

Figure 3:
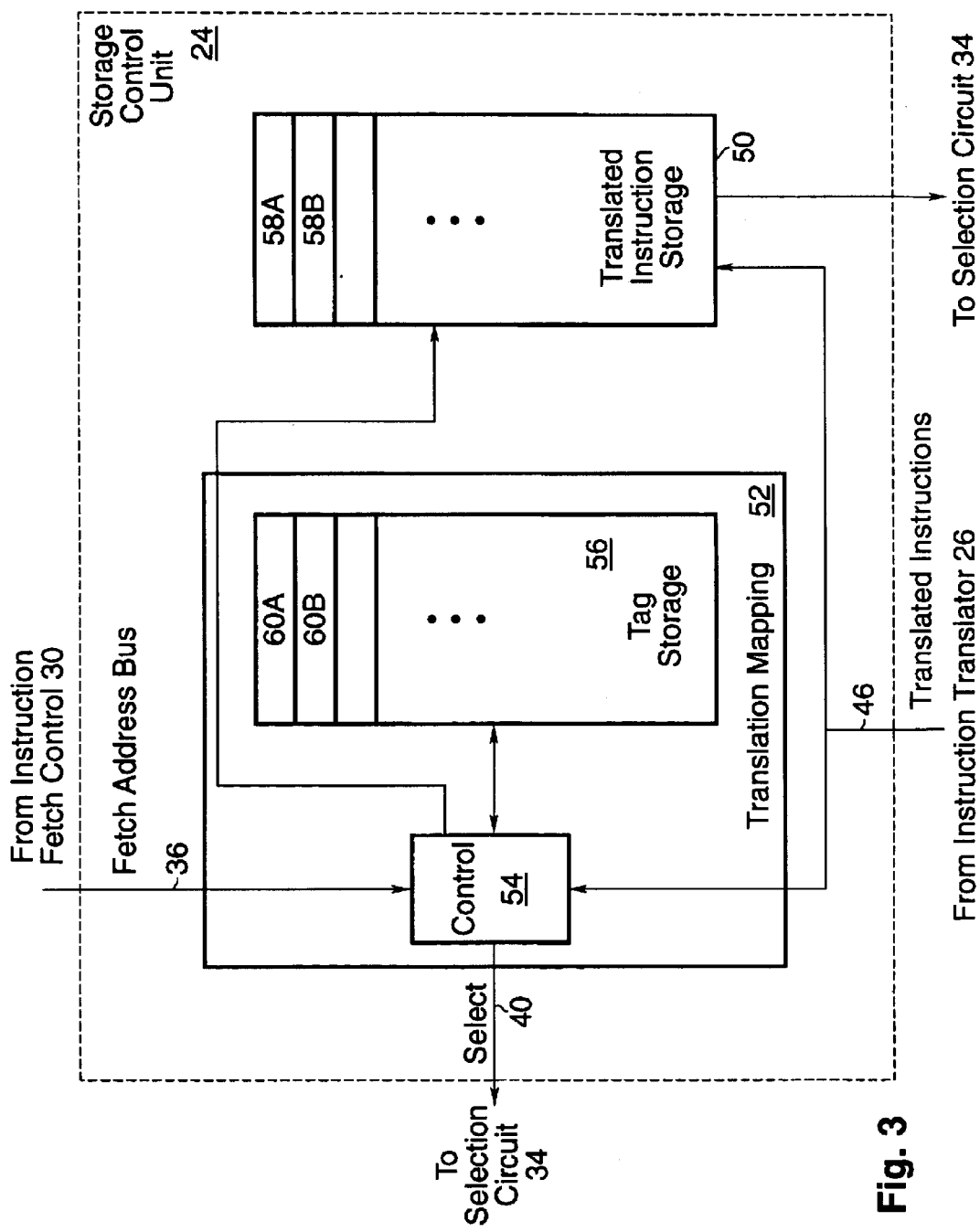
FIG. 3 is a block diagram of one embodiment of the storage control unit shown in FIG. 2.

Turning next to FIG. 3, a block diagram of one embodiment of storage control unit 24 is shown. Storage control unit 24 includes a translated instruction storage 50 and a translation mapping unit 52. Fetch address bus 36 is coupled to a control unit 54 within translation mapping unit 52. Translated instructions bus 46 is coupled to translated instruction storage 50 and to control unit 54. Translated instruction storage 50 provides instructions to selection circuit 34, while control unit 54 provides the selection control upon select line 40. Additionally, control unit 54 is coupled to translated instruction storage 50. Translation mapping unit 52 additionally includes a tag storage 56 which stores tag information regarding instructions stored in translated instruction storage 50.

Translated instruction storage 50 includes a plurality of storage locations (e.g. storage locations 58A and 58B). Each storage location includes sufficient storage for storing a cache line of translated instructions (i.e. a translated code sequence as well as untranslated instructions within the cache line including the translated instructions). Tag storage 56 includes a corresponding plurality of storage locations (e.g. storage locations 60A and 60B). Tag storage 56 stores tag information regarding the instructions in a corresponding storage location within translated instruction storage 50. For example, tag information regarding the cache line of instructions stored in storage location 58A is stored in storage location 60A, etc.

When a fetch address is conveyed upon fetch address bus 36, control unit 54 searches the storage locations within tag storage 56 for a tag address corresponding to the fetch address. If a tag address matching the fetch address is detected, control unit 54 asserts the selection control upon select line 40. Conversely, the selection control is deasserted by control unit 54 if no tag address matches the fetch address. Additionally, control unit 54 directs translated instruction storage 50 to convey instructions corresponding to the matching tag address to selection circuit 34, if a matching tag address is detected. In this manner, instructions from translated instruction storage 50 are substituted for instructions from cache storage and control block 32. Advantageously, previously translated code sequences need not be retranslated if stored in storage control unit 24.

When translated instructions and a corresponding address are received from instruction translator circuit 26 upon translated instructions bus 26, the instructions are stored into translated instruction storage 50 and tag storage 56. Control unit 54 selects storage locations within tag storage 56 and translated instruction storage 50 based upon predetermined selection criteria. In one embodiment, control unit 54 maintains a count corresponding to each translated code sequence stored in translated instruction storage 50. The count indicates the number of times a particular translated code sequence is used by microprocessor 10. Each time control unit 54 causes conveyance of instructions from a storage location 58 within translated instruction storage 50 to selection circuit 34, the corresponding count is incremented. When control unit 54 allocates a storage location to newly received translated instructions, control unit 54 allocates a storage location which is not storing a translated code sequence. If all storage locations are storing a translated code sequence, control unit 54 selects a storage location having a count value which is numerically smallest among the stored count values. In this manner, translated instruction sequences which are most often used are retained within storage control unit 24.

According to one embodiment, translator circuit 26 conveys an instruction identification field along with the translated instruction sequence and address. The instruction identification field identifies which instruction bytes correspond to translated instructions and which instruction bytes correspond to untranslated instructions. For example, the instruction identification field may comprise a bit for each byte in the cache line. If the bit is set, the instruction byte belongs to a translated instruction. If the bit is clear, the instruction byte belongs to an untranslated instruction. When instructions are conveyed from cache storage and control unit 32 (shown in FIG. 2), a field of zeros is conveyed.

By comparing fetch addresses received upon fetch address bus 36 to addresses stored in tag storage 56 and thereby selecting one of the storage locations within translated instruction storage 50 to convey instructions to selection circuit 34, translation mapping circuit 52 provides a mapping of fetch addresses to a particular storage location (and hence to the translated code sequence stored therein). As used herein, the term "mapping" refers to identifying a translated code sequence corresponding to a particular fetch address.

It is noted that instruction translation storage 50 and tag storage 56 may be included within the same random access memory (RAM) array as the storage within cache storage and control block 32. Alternatively, separate RAM arrays may be employed.

Figure 4:
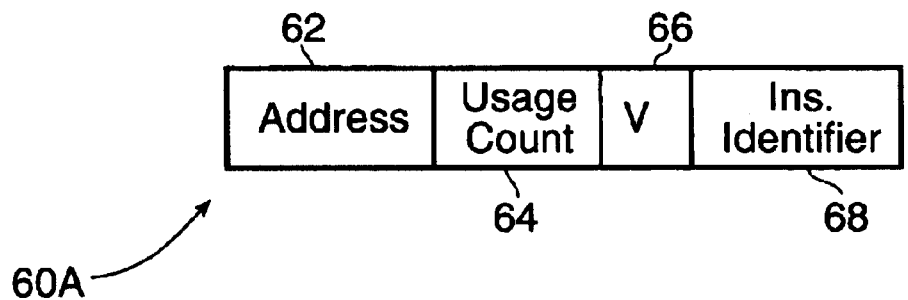
FIG. 4 is a diagram of information stored in the storage control unit shown in FIG. 3, according to one embodiment of the control unit.

Turning now to FIG. 4, a diagram depicting information stored in a storage location 60A of tag storage 56 is shown according to one embodiment of storage control unit 24. Other storage locations 60 may be configured similarly. Storage location 60A includes an address field 62, a usage count field 64, a valid field 66, and an instruction identification field 68.

Address field 62 stores the tag and index portions of the address at which the original (i.e. untranslated) code sequence is stored. The tag and index portions of the address stored in address field 62 are compared to the tag and index portions of the address upon fetch address bus 36 by control unit 54. If the comparison indicates equality, then the storage location within translated instruction storage 50 corresponding to storage location 60A (i.e. storage location 58A) is storing a translated instruction sequence corresponding to the instruction fetch address.

Usage count field 64 stores the count of the number of times that microprocessor 10 fetches the translated code sequence. Control unit 54 initializes the count to zero when the translated code sequence is stored, and increments the count each time the translated code sequence is fetched. Finally, valid field 66 stores an indication that storage location 60A and corresponding storage location 58A are storing valid information. In one embodiment, valid field 66 comprises a bit. The bit is indicative, when set, that the storage locations are storing valid information. When clear, the bit indicates that valid information is not being stored. Control unit 54 may allocate storage locations for which valid field 66 indicates invalid prior to allocating storage locations according to usage count field 64. Finally, instruction identification field 68 stores the instruction identification field provided by translator circuit 26.

Figure 5:
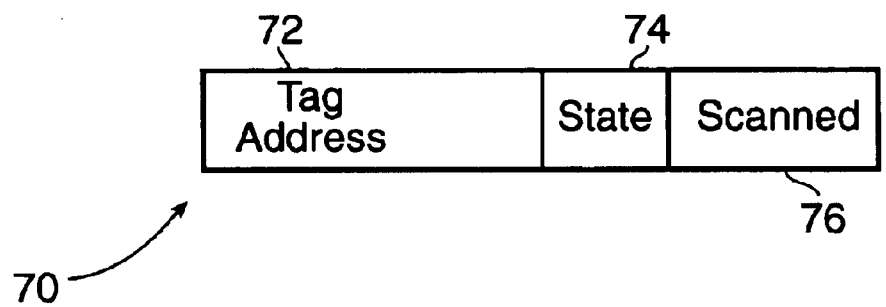
FIG. 5 is a diagram of information stored with respect to each cache line in the instruction cache shown in FIG. 2, according to one embodiment of the instruction cache.

Turning now to FIG. 5, a diagram of tag information 70 stored for each cache line in cache storage and control block 32 is shown. Tag information 70 includes a tag address 72, a state field 74, and a scanned field 76. Tag address 72 stores the tag portion of the address corresponding to the cache line. State field 74 stores the state of the cache line. In one embodiment, state field 74 comprises a bit indicative, when set, that the corresponding cache line is valid. When clear, the bit indicates that the corresponding cache line in invalid (i.e. no instructions are stored within the corresponding cache line). Scanned field 76 is included for use by instruction translator circuit 26. When instruction translator circuit 26 scans a line (via prefetch bus 44, for example), instruction translator circuit 26 may set the scanned field to indicate that the cache line has been scanned. In this manner, instruction translator circuit 26 may determine that the cache line has been previously scanned. If an instruction translation is performed, then the corresponding translated code sequence is stored in storage control unit 24. When storage control unit 24 replaces a translated code sequence with another translated code sequence provided by instruction translation circuit 26, storage control unit 24 may inform cache storage and control block 32 of the replaced address. Cache storage and control block 32 may reset the corresponding scanned field 76 accordingly. In one embodiment, scanned field 76 comprises a bit. The bit is indicative, when set, that the corresponding cache line has been scanned by instruction translator circuit 26. When clear, the bit is indicative that the corresponding cache line has not been scanned by instruction translator circuit 26.

Figure 6:
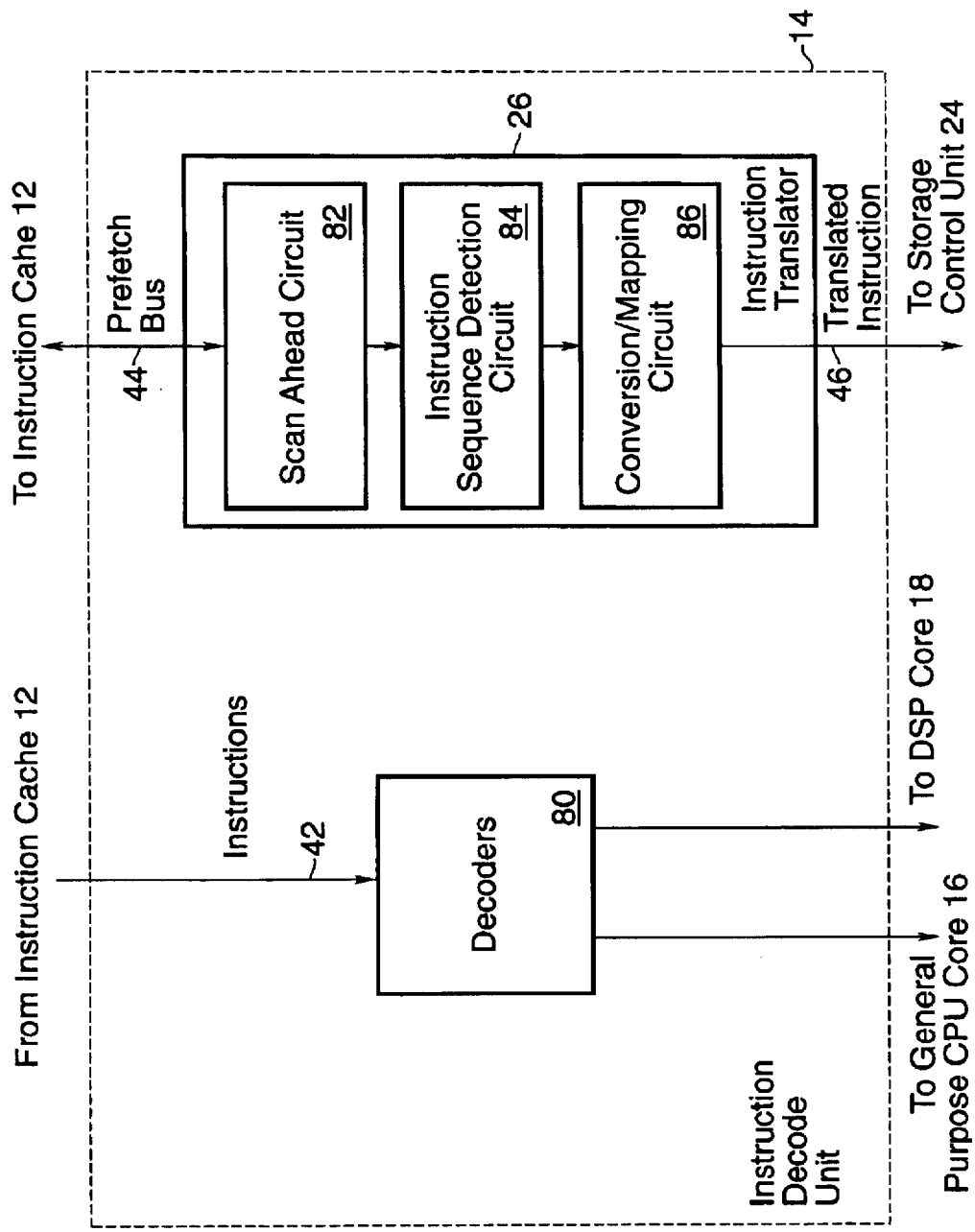
FIG. 6 is a block diagram of one embodiment of the instruction decode unit shown in FIG. 1.

Turning now to FIG. 6, a block diagram of one embodiment of instruction decode unit 14 is shown. Instruction decode unit 14 includes a decoder block 80 and instruction translator circuit 26. Decoder block 80 is coupled to instructions bus 42 from instruction cache 12. Additionally, decoder block 80 is coupled to CPU core 16 and DSP core 18. Instruction translator circuit 26 is coupled to prefetch bus 44 and to translated instructions bus 46.

In the embodiment shown, instruction translator circuit 26 includes a scan ahead circuit 82, an instruction sequence detection circuit 84, and a conversion/mapping circuit 86. Scan ahead circuit 82 is configured to communicate with instruction cache 12 in order to prefetch instructions from the instruction stream to be executed by microprocessor 10. Scan ahead circuit 82 detects branch instructions and may perform branch prediction in order to determine which cache lines of instructions to prefetch. However, such functionality is optional. In this manner, instruction translation circuit 26 may translate instructions prior to the instructions being fetched and conveyed upon instructions bus 42 to decoder block 80. Additionally, scan ahead circuit 82 may set the scanned field 76 of the cache line prefetched to indicate that the cache line has been scanned. When scan ahead circuit 82 prefetches a cache line, scan ahead circuit 82 examines the state of the scanned field 76 corresponding to the cache line. If the scanned field 76 is set, then scan ahead circuit 82 does not convey the corresponding instructions to instruction sequence detection circuit 84. If the scanned field 76 is not set, then scan ahead circuit 82 does convey the corresponding instructions to instruction sequence detection circuit 84.

Instruction sequence detection circuit 84 examines the instructions conveyed thereto by scan ahead circuit 82. Instruction sequence detection circuit 84 attempts to identify code sequences which may be more efficiently executed by DSP core 18 than CPU core 16. If such a code sequence is detected, instruction sequence detection circuit 84 indicates the detected code sequence to conversion/mapping circuit 86. Instruction sequence detection circuit 84 may detect code sequences via a lookup table containing a predetermined number of code sequences. Instruction sequence detection circuit 84 compares the received instructions to the table of code sequences. If a match is found, then the matching sequence is conveyed to conversion/mapping circuit 86. Alternatively, instruction sequence detection circuit 84 may include a pattern recognition circuit configured to recognize certain patterns of instructions which are indicative of code sequences which may be performed by DSP core 18. Numerous alternatives may be employed within instruction sequence detection circuit 84. Additional information regarding instruction sequence detection circuit 84 and instruction translator circuit 26 may be found in the commonly assigned, co-pending patent application entitled: "Central Processing Unit Having an X86 and DSP core and Including a DSP Function Decoder Which Maps X86 instructions to DSP Instructions", Ser. No. 08/618,243, filed Mar. 18, 1996, by Asghar, et al. The disclosure of this patent application is incorporated herein by reference in its entirety.

Conversion/mapping circuit 86 is configured to map the detected code sequences into instructions for DSP core 18. In one embodiment, conversion/mapping circuit 86 is configured to generate an instruction which identifies a routine stored in DSP core 18 for execution. Additionally, the instruction may identify parameters for the routine in accordance with the detected instruction sequence. The instruction is inserted in place of the detected code sequence within the cache line of instructions conveyed thereto. The cache line of translated instructions (i.e. the translated code sequence instruction and the contiguous non-translated instructions) are transferred upon translated instructions bus 46 to storage control unit 24.

Alternatively, conversion/mapping circuit 86 may generate a plurality of instructions corresponding to the code sequence. The plurality of instructions define a routine for execution by DSP core 18, and may be inserted into the cache line of instructions in place of the original code sequence. The cache line of instructions thus created are then transferred to storage control unit 24 upon translated instructions bus 46.

Because code sequences are stored in storage control unit 24, scan ahead circuit 82 may circumvent retranslation of code sequences which have been previously translated. If instruction sequence detection circuit 84 and/or conversion/mapping circuit 86 require multiple clock cycles to complete their respective functions, then instruction translator circuit 26 may be capable of scanning even farther ahead of the instructions currently being executed when previously scanned instruction cache lines are refetched. Advantageously, additional cache lines of instructions may be translated prior to being fetched for execution. Performance may be increased by allowing translation upon a more complete portion of the instructions being executed by microprocessor 10.

Decoder block 80 includes one or more decoder circuits configured to decode instructions from the instruction set of CPU core 16 and the instruction set of DSP core 18. If a particular instruction is included within the instruction set of CPU core 16, then decoder block 80 routes the particular instruction to CPU core 16. Conversely, if the particular instruction is included within the instruction set of DSP core 18, then the particular instruction is routed to DSP core 18. Decoder block 80 determines which instruction set the particular instruction belongs to according to the instruction identification field, which is conveyed with the instructions.

Figure 7:
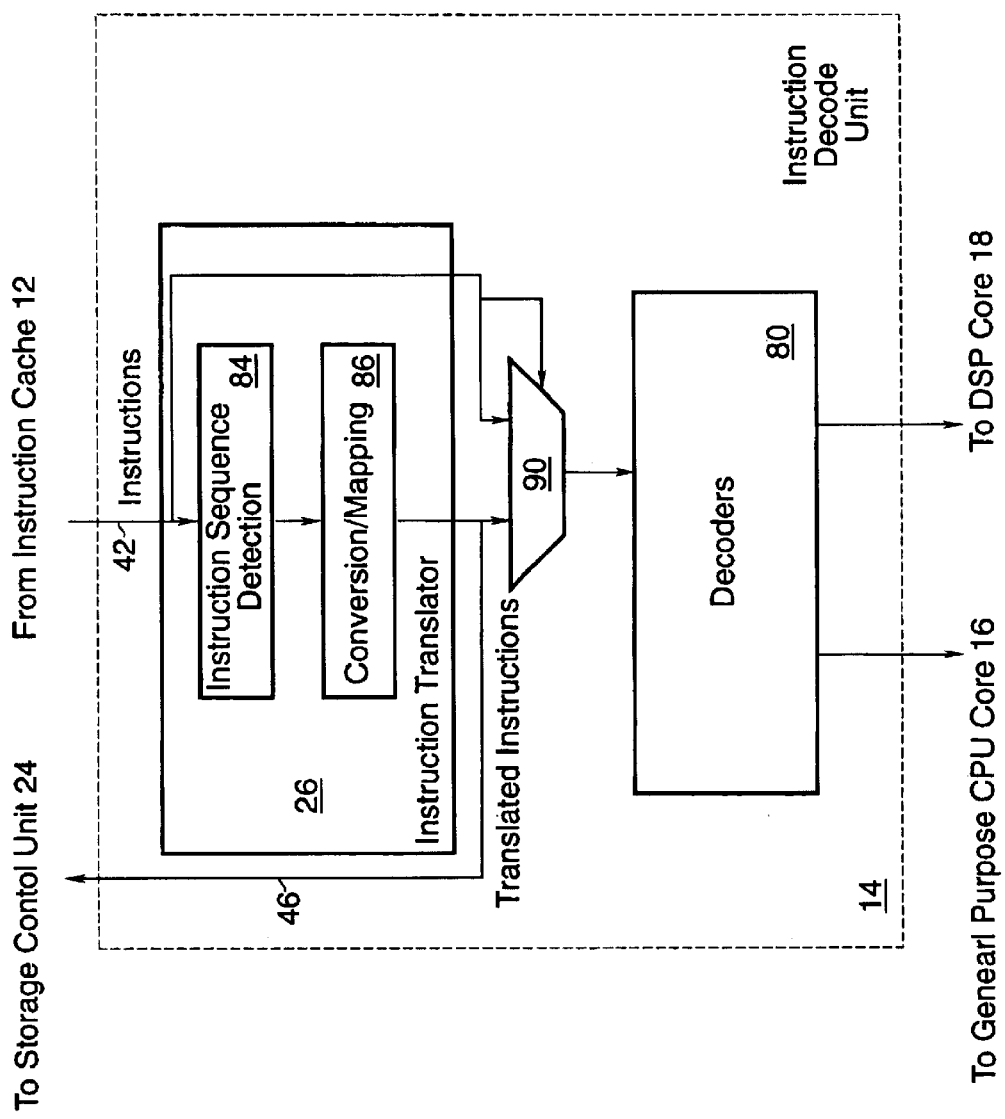
FIG. 7 is a block diagram of another embodiment of the instruction decode unit shown in FIG. 1.

Turning now to FIG. 7, a second embodiment of instruction decode unit 14 is shown. In the embodiment of FIG. 7, instruction decode unit 14 includes decoder block 80 and instruction translator circuit 26. Additional, a selection circuit 90 is included. Instruction translator circuit 26 is coupled to instructions bus 42. Instruction translator circuit 26 provides translated code sequences upon translated instructions bus 46, which is coupled to selection circuit 90 as well as to storage control unit 24. Instructions bus 42 is additionally coupled to selection circuit 90. The selection control of selection circuit 90 is the selection control upon select line 40 (shown in FIG. 3). Decoder block 80 receives the output of selection circuit 90 and routes the instructions received therefrom to CPU core 16 and/or DSP core 18.

In the embodiment shown in FIG. 7, instruction translator circuit 26 translates code sequences as the instructions are fetched for execution. Because instruction translator circuit 26 employs multiple clock cycles to perform instruction translations, performance may be increased by bypassing instruction translator circuit 26 when the instructions conveyed were stored in storage control unit 24. Selection circuit 90 therefore selects the instructions upon instructions bus 42 when the corresponding selection control from select line 40 is asserted (indicating that the instructions are stored in storage control unit 24 and therefore have been previously translated). The instructions thus selected may be immediately decoded by decoders 80 instead of flowing through instruction translator circuit 26. Instructions which have yet to be translated flow through instruction translator circuit 26 prior to being presented to decoder block 80 for decode and routing. Additional information regarding an instruction translator circuit configured into the instruction execution pipeline may be found in the commonly assigned, co-pending patent application entitled: "An Instruction Translation Unit Configured to Translate from a First Instruction Set to a Second Instruction Set", Ser. No. 08/583, 154, filed Jan. 4, 1996 by Ireton. This patent application is incorporated herein by reference in its entirety.

It is noted that, although depicted herein as located in instruction cache 12 and instruction decode unit 14, respectively, storage control unit 24 and instruction translator circuit 26 may be located anywhere within microprocessor 10. For example, the embodiment of instruction translator circuit 26 shown in FIG. 6 may be included in instruction cache 12.

Figure 8:
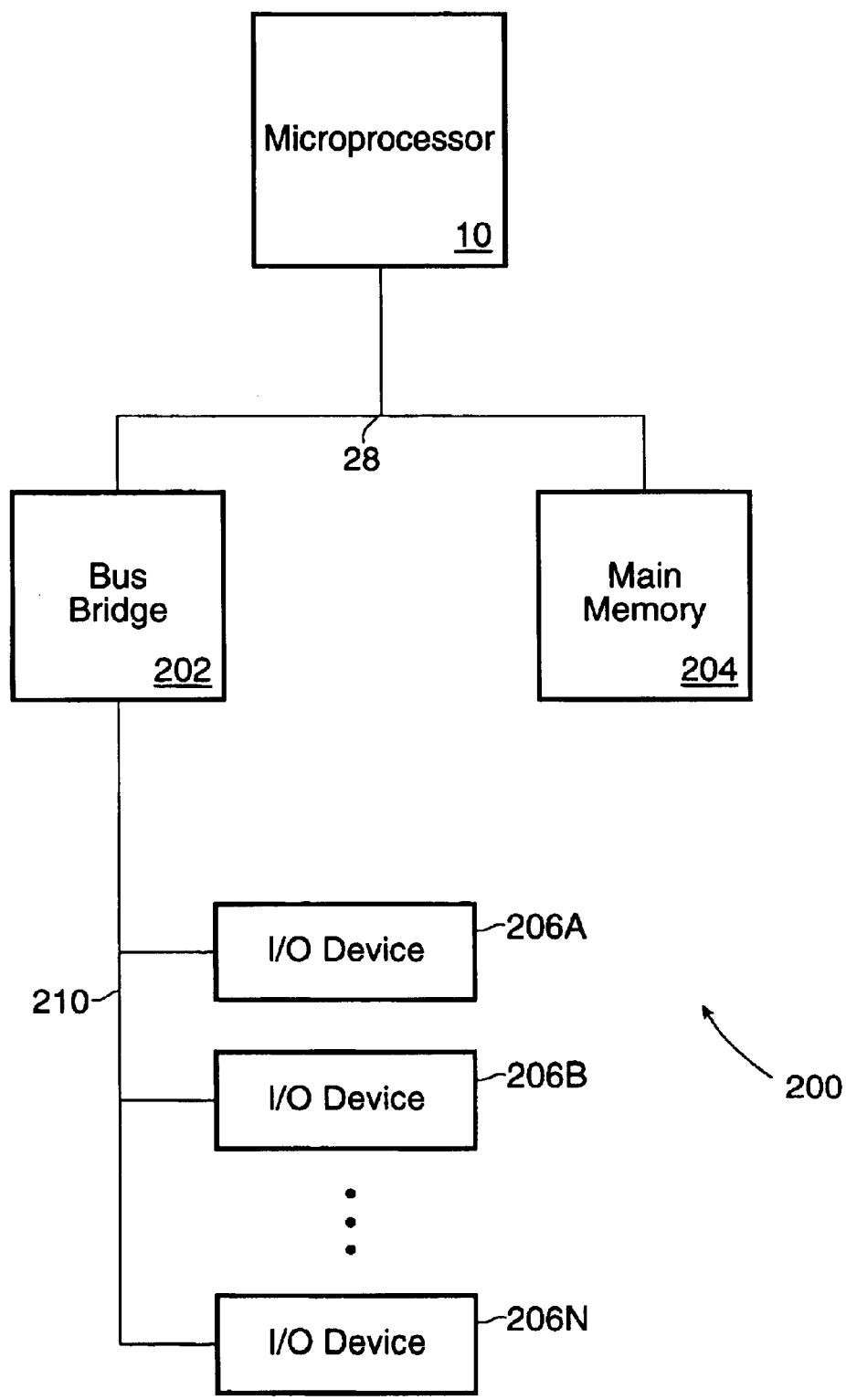
FIG. 8 is a block diagram of a computer system including the microprocessor shown in FIG. 1.

Turning now to FIG. 8, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 28. I/O devices 206 are coupled to an I/O bus 210 for communication with bus bridge 202.

Bus bridge 202 is provided to assist in communications between I/O devices 206 and devices coupled to system bus 28. I/O devices 206 typically require longer bus clock cycles than microprocessor 10 and other devices coupled to system bus 28. Therefore, bus bridge 202 provides a buffer between system bus 28 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 8 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 28, or may reside on system bus 28 in a "lookaside" configuration.

It is noted that the above discussion refers to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

In accordance with the above disclosure, a microprocessor has been described which translates certain code sequences from a first instruction set to a second instruction set. The code sequences are selected for translation if the code sequences may be more efficiently executed in the second instruction set. Additionally, the translated code sequences are stored in a storage control unit such that, upon execution of the code sequences, the translated code sequences may be provided. Advantageously, retranslation of previously translated code sequences may be avoided. Performance may be increased to the extent that instruction translation deleteriously affects performance.

Numerous variations and modifications will become apparent to those skilled in the art once the above disclosure is fully appreciated. It is intended that the following claims be interpreted to embrace all such variations and modifications.

What is claimed is:

1. A method of executing instructions in a microprocessor, comprising:

translating a first plurality of instructions from a first instruction set into at least one instruction from a second instruction set, said first plurality of instructions defining an operation which is efficiently performed via execution in said second instruction set;

executing a code sequence including said at least one instruction and a second plurality of instructions coded in said first instruction set in a first execution core and a second execution core within said microprocessor, said first execution core being configured to execute instructions from said first instruction set and said second execution core being configured to execute instructions from said second instruction set, wherein said first execution core thereby executes said second plurality of instructions and said second execution core thereby executes said at least one instruction; and storing said at least one instruction via a storage control unit within said microprocessor, such that said at least one instruction is executed in lieu of said first plurality of instructions upon execution of said code sequence.

2. The method as recited in claim 1 wherein said second instruction set comprises a digital signal processing instruction set.

3. The method as recited in claim 1 wherein said at least one instruction is stored in a storage circuit within said storage control unit.

4. The method as recited in claim 3 wherein said storage circuit is searched concurrent with searching an instruction cache within said microprocessor for instructions within said code sequence.

5. A microprocessor comprising:

a first execution core configured to execute instructions coded in a first instruction set;

a second execution core configured to execute instructions coded in a second instruction set;

an instruction translation circuit configured to receive a stream of instructions coded in said first instruction set, detect a first instruction sequence in said stream of instructions, and translate said first instruction sequence into at least one translated instruction coded in said second instruction set;

said first execution core being coupled to said instruction translation circuit such that said first execution core receives and executes said instructions coded in said first instruction set;

said second execution core being coupled to said instruction translation circuit such that said second execution core receives and executes said instructions coded in said second instruction set.

6. The microprocessor of claim 5 further comprising a storage control unit configured to store said at least one translated instruction and to substitute said at least one translated instruction for said first instruction sequence in said stream of instructions and wherein said instruction translation circuit is configured to translate occurrences of said first instruction sequence subsequent to a first occurrence by retrieving said translated instruction via said storage control unit.

7. A microprocessor comprising:

a cache storage unit including a first plurality of line storages configured to store lines of instructions coded in a first instruction set;

an instruction translation circuit configured (a) to receive a first line of instructions coded in said first instruction set from said cache storage unit, (b) to scan said first line for an occurrence of a predetermined instruction sequence from said first instruction set in said first line, and (c) upon an affirmative detection of said predetermined instruction sequence in said first line to substitute at least one instruction coded in a second instruction set for said predetermined instruction sequence within said first line;

a storage control unit configured to store said first line after said substitution and an address value associated with said first line;

a fetch control unit configured to generate a fetch address;

wherein said storage control unit is configured to provide said first line of instructions after said substitution for decode and execution in said microprocessor in response to said fetch address matching said address value for said first line;

wherein said cache storage unit further includes a first plurality of address tags corresponding to said first plurality of line storages, wherein said cache storage unit is configured to provide a second line of instructions from one of said first plurality of line storages for decode and execution in said microprocessor in response to said fetch address matching the address tag corresponding to said one of said first plurality of line storages;

wherein said storage control unit further includes a second plurality of line storages and a corresponding second plurality of address tags, wherein said storage control unit is configured to provide a third line of instructions from one of said second plurality of line storages for decode and execution in said microprocessor in response to said fetch address matching the address tag corresponding to said one of said second plurality of line storages;

a selection circuit coupled to said cache storage unit and said storage control unit, wherein said selection circuit is configured to disable said provision of said second line and enable provision of said third line for decoding and execution in said microprocessor in response to said fetch address (a) matching said address tag of second line in said cache storage unit, and (b) matching said address tag of said third line in said storage control unit;

a first execute unit a second execute unit and an instruction decode unit, wherein said instruction decode unit is configured to receive lines of instructions from said selection circuit, dispatch instructions from said first instruction set to said first execute unit, and dispatch instructions from said second instruction set to said second execute unit.

8. The microprocessor of claim 7, wherein said second instruction set comprises a digital signal processor instruction set, and said second execute unit comprises a digital signal processing unit.

* * * * *